(12) United States Patent
Goodbrand et al.

(10) Patent No.: US 6,414,051 B1
(45) Date of Patent: Jul. 2, 2002

(54) ACOUSTIC PRINTING INKS CONTAINING BIS(CARBAMATES)

(75) Inventors: H. Bruce Goodbrand, Hamilton; Danielle C. Boils, Mississauga; Pudupadi R. Sundararajan, Oakville; Raymond W. Wong, Mississauga, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/495,716

(22) Filed: Feb. 1, 2000

(51) Int. Cl.$^7$ ............................. C09D 11/10; B41J 2/06; B41J 2/045; C08L 75/00

(52) U.S. Cl. .................... 523/160; 524/589; 524/590; 347/46

(58) Field of Search ............................. 523/160, 161; 106/31.6, 31.28, 31.43, 31.75; 347/46, 55; 524/589, 590, 555, 839

(56) References Cited

U.S. PATENT DOCUMENTS

| | | | |
|---|---|---|---|
| 4,745,419 A | | 5/1988 | Quate et al. ............. 346/140 R |
| 4,759,832 A | * | 7/1988 | Degner et al. ............. 204/425 |
| 4,820,346 A | * | 4/1989 | Nowak ........................ 564/169 |
| 5,053,079 A | | 10/1991 | Haxell et al. ................. 106/31 |
| 5,541,627 A | | 7/1996 | Quate ........................... 347/10 |
| 5,747,554 A | * | 5/1998 | Sacripante et al. ......... 523/161 |
| 5,750,604 A | | 5/1998 | Banning et al. ............ 524/187 |
| 5,780,528 A | | 7/1998 | Titterington et al. ........ 523/161 |
| 5,782,966 A | | 7/1998 | Bui et al. .................. 106/31.43 |
| 5,783,658 A | | 7/1998 | Banning et al. ............. 528/590 |
| 5,815,178 A | * | 9/1998 | Silverbrook ................... 347/55 |
| 5,827,918 A | | 10/1998 | Titterington et al. ........ 524/590 |
| 5,830,942 A | | 11/1998 | King et al. .................. 524/590 |
| 5,881,648 A | | 3/1999 | Pavlin ........................... 101/491 |
| 5,898,446 A | * | 4/1999 | Moriyama et al. ............ 347/46 |
| 5,919,839 A | | 7/1999 | Titterington et al. ........ 523/161 |
| 5,932,630 A | * | 8/1999 | Kovacs et al. ............... 523/161 |
| 6,022,910 A | * | 2/2000 | Nishizaki et al. ............ 523/161 |
| 6,045,607 A | * | 4/2000 | Breton et al. ............. 106/31.29 |
| 6,071,986 A | * | 6/2000 | Everhardus et al. ......... 523/160 |

FOREIGN PATENT DOCUMENTS

| | | | |
|---|---|---|---|
| DE | 3630319 | * | 3/1988 |
| EP | 825025 | * | 2/1988 |
| GB | 917869 | * | 2/1963 |
| WO | WO 97/12003 | | 4/1997 |
| WO | WO 97/13816 | | 4/1997 |

OTHER PUBLICATIONS

English Translation of DE 3630319.*

* cited by examiner

Primary Examiner—Vasu Jagannathan
Assistant Examiner—Callie E Shosho
(74) Attorney, Agent, or Firm—Judith L. Byorick

(57) ABSTRACT

Disclosed is a printing process which comprises (1) incorporating into an acoustic ink jet printing apparatus an ink composition comprising (a) an ink vehicle which comprises a bis(carbamate) of the formula

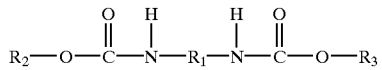

wherein $R_1$ is an alkylene group and $R_2$ and $R_3$ each, independently of the other, are alkyl groups or alkylene oxide or polyalkylene oxide groups of the formula $-(C_nH_{2n}O)_yH$, wherein n is an integer of 2 or 3 and y is an integer representing the number of repeat alkylene oxide units, (b) a colorant, (c) an optional conductivity enhancing agent, (d) an optional antioxidant, (e) an optional UV absorber, (f) an optional clarifier, (g) an optional tackifier, (h) an optional adhesive, and (i) an optional plasticizer, (2) melting the ink, and (3) causing droplets of the melted ink to be ejected by acoustic beams in an imagewise pattern onto a recording sheet.

20 Claims, No Drawings

ACOUSTIC PRINTING INKS CONTAINING BIS(CARBAMATES)

BACKGROUND OF THE INVENTION

The present invention is directed to hot melt ink compositions. More specifically, the present invention is directed to ink compositions suitable for use in hot melt acoustic ink printing processes, particularly those in which conductive inks are desirable. One embodiment of the present invention is directed to a printing process which comprises (1) incorporating into an acoustic ink jet printing apparatus an ink composition comprising (a) an ink vehicle which comprises a bis(carbamate) of the formula

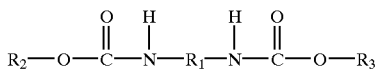

wherein $R_1$ is an alkylene group and $R_2$ and $R_3$ each, independently of the other, are alkyl groups or alkylene oxide or polyalkylene oxide groups of the formula —$(C_nH_{2n}O)_yH$, wherein n is an integer of 2 or 3 and y is an integer representing the number of repeat alkylene oxide units, (b) a colorant, (c) an optional conductivity enhancing agent, (d) an optional antioxidant, (e) an optional UV absorber, (f) an optional clarifier, (g) an optional tackifier, (h) an optional adhesive, and (i) an optional plasticizer, (2) melting the ink, and (3) causing droplets of the melted ink to be ejected by acoustic beams in an imagewise pattern onto a recording sheet.

Acoustic ink jet printing processes are known. In acoustic ink jet printing processes, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. These principles have been applied to prior ink jet and acoustic printing proposals. For example, K. A. Krause, "Focusing Ink Jet Head," IBM Technical Disclosure Bulletin, Vol. 16, No. 4, September 1973, pp. 1168–1170, the disclosure of which is totally incorporated herein by reference, describes an ink jet in which an acoustic beam emanating from a concave surface and confined by a conical aperture was used to propel ink droplets out through a small ejection orifice. Acoustic ink printers typically comprise one or more acoustic radiators for illuminating the free surface of a pool of liquid ink with respective acoustic beams. Each of these beams usually is brought to focus at or near the surface of the reservoir (i.e., the liquid/air interface). Furthermore, printing conventionally is performed by independently modulating the excitation of the acoustic radiators in accordance with the input data samples for the image that is to be printed. This modulation enables the radiation pressure which each of the beams exerts against the free ink surface to make brief, controlled excursions to a sufficiently high pressure level for overcoming the restraining force of surface tension. That, in turn, causes individual droplets of ink to be ejected from the free ink surface on demand at an adequate velocity to cause them to deposit in an image configuration on a nearby recording medium. The acoustic beam may be intensity modulated or focused/defocused to control the ejection timing, or an external source may be used to extract droplets from the acoustically excited liquid on the surface of the pool on demand. Regardless of the timing mechanism employed, the size of the ejected droplets is determined by the waist diameter of the focused acoustic beam. Acoustic ink printing is attractive because it does not require the nozzles or the small ejection orifices which have caused many of the reliability and pixel placement accuracy problems that conventional drop on demand and continuous stream ink jet printers have suffered. The size of the ejection orifice is a critical design parameter of an ink jet because it determines the size of the droplets of ink that the jet ejects. As a result, the size of the ejection orifice cannot be increased, without sacrificing resolution. Acoustic printing has increased intrinsic reliability because there are no nozzles to clog. As will be appreciated, the elimination of the clogged nozzle failure mode is especially relevant to the reliability of large arrays of ink ejectors, such as page width arrays comprising several thousand separate ejectors. Furthermore, small ejection orifices are avoided, so acoustic printing can be performed with a greater variety of inks than conventional ink jet printing, including inks having higher viscosities and inks containing pigments and other particulate components. It has been found that acoustic ink printers embodying printheads comprising acoustically illuminated spherical focusing lenses can print precisely positioned pixels (i.e., picture elements) at resolutions which are sufficient for high quality printing of relatively complex images. It has also been discovered that the size of the individual pixels printed by such a printer can be varied over a significant range during operation, thereby accommodating, for example, the printing of variably shaded images. Furthermore, the known droplet ejector technology can be adapted to a variety of printhead configurations, including (1) single ejector embodiments for raster scan printing, (2) matrix configured ejector arrays for matrix printing, and (3) several different types of pagewidth ejector arrays, ranging from single row, sparse arrays for hybrid forms of parallel/serial printing to multiple row staggered arrays with individual ejectors for each of the pixel positions or addresses within a pagewidth image field (i.e., single ejector/pixel/line) for ordinary line printing. Inks suitable for acoustic ink jet printing typically are liquid at ambient temperatures (i.e., about 25° C.), but in other embodiments the ink is in a solid state at ambient temperatures and provision is made for liquefying the ink by heating or any other suitable method prior to introduction of the ink into the printhead. Images of two or more colors can be generated by several methods, including by processes wherein a single printhead launches acoustic waves into pools of different colored inks. Further information regarding acoustic ink jet printing apparatus and processes is disclosed in, for example, U.S. Pat. No. 4,308,547, U.S. Pat. No. 4,697,195, U.S. Pat. No. 5,028,937, U.S. Pat. No. 5,041,849, U.S. Pat. No. 4,751,529, U.S. Pat. No. 4,751,530, U.S. Pat. No. 4,751,534, U.S. Pat. No. 4,801,953, and U.S. Pat. No. 4,797,693, the disclosures of each of which are totally incorporated herein by reference. The use of focused acoustic beams to eject droplets of controlled diameter and velocity from a free-liquid surface is also described in J. Appl. Phys., vol. 65, no. 9 (May 1, 1989) and references therein, the disclosure of which is totally incorporated herein by reference.

In acoustic ink printing processes, the printhead produces approximately 2.2 picoliter droplets by an acoustic energy process. The ink under these conditions preferably displays a melt viscosity of from about 1 to about 25 centipoise at the jetting temperature. In addition, once the ink has been jetted onto the printing substrate, the image thus generated preferably exhibits excellent crease properties, and is nonsmearing, waterfast, of excellent transparency, and of excellent fix. The vehicle preferably displays a low melt viscosity in the acoustic head while also displaying solid like properties after being jetted onto the substrate. Since the acoustic head can tolerate temperatures typically up to about 180° C., the vehicle for the ink preferably displays liquid-like properties (such as a viscosity of from about 1 to about 25 centipoise) at a temperature of from about 75 to about 180° C., and solidifies or hardens after being jetted onto the substrate.

Ink jet printing processes that employ inks that are solid at room temperature and liquid at elevated temperatures are known. For example, U.S. Pat. No. 4,490,731, the disclosure of which is totally incorporated herein by reference, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal ink jet printing processes employing these phase-change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase-change ink is applied to the substrate, freezing on the substrate resolidifies the ink.

In phase-change printing processes, the ink preferably undergoes a change with temperature from a solid state to a liquid state in a desirably short period of time, typically in less than about 100 milliseconds. One advantage of phase-change inks is their ability to print superior images on plain paper, since the phase-change ink quickly solidifies as it cools, and, since it is primarily waxy in nature, it does not normally soak into a paper medium.

Phase-change inks also preferably exhibit a high degree of transparency, generally measured in terms of haze value of the ink. Transparent, low haze inks exhibit high gloss and high optical density compared to opaque inks, although both may appear to be evenly colored.

U.S. Pat. No. 5,750,604 (Banning et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,782,966 (Bui et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,783,658 (Banning et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,780,528 (Titterington et al.), the disclosure of which is totally incorporated herein by reference, discloses isocyanate-derived colored resins made by reacting an alcohol and/or amine, an isocyanate and a nucleophilic molecule containing a chromogen. The isocyanate-derived colored resins are useful as colorant materials in phase change ink compositions.

U.S. Pat. No. 5,881,648 (Pavin), the disclosure of which is totally incorporated herein by reference, discloses solid compositions containing diamidediurethanes useful as components of hot-melt inks. Diamidiurethanes may be prepared by reaction of a hydroxycarboxylic acid and/or lactone with either (1) monoamine and diisocyanate or (2) diamine and monoisocyanate. Alternatively, the diamidediurethane may be prepared by reacting a non-hydric carboxylic acid and/or anhydride with an hydroxyamine and a diisocyanate. The reactant identity and stoichiometry, as well as the reaction conditions, may be tailored to optimize the formation of diamidediurethane in preference to high molecular weight oligomers. The hot-melt inks may be used in ink jet, flexographic, gravure and intaglio printing.

U.S. Pat. No. 5,827,918 (Titterington et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of diurethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,830,942 (King et al.), the disclosure of which is totally incorporated herein by reference, discloses resins and waxes made by reacting selected nucleophiles, including alcohols and/or amines, with an isocyanate. The order of addition of the isocyanate and the different nucleophiles can tailor the distribution of diurethane, mixed urethane/urea, and/or di-urea molecules in the final resin product. The isocyanate-derived resin and wax materials are useful as ingredients as phase change ink carrier compositions used to make phase change ink jet inks.

U.S. Pat. No. 5,919,839 (Titterington et al.), the disclosure of which is totally incorporated herein by reference, discloses colored waxes made by reacting selected nucleophiles, including alcohol containing colorants with an isocyanate. A phase change ink is made by blending the colored wax with a clear ink carrier composition. The clear ink carrier composition can be a fatty amide-based material and/or a combination of isocyanate-derived resins in which the order of addition of the isocyanate and the different nucleophiles can tailor the distribution of di-urethane, mixed urethane/urea, and/or di-urea molecules in the final resin product. The colored wax materials are useful as ingredients with phase change ink carrier compositions to make phase change ink jet inks.

U.S. Pat. No. 5,053,079 (Haxell et al.), the disclosure of which is totally incorporated herein by reference, discloses a dispersed, pigmented hot melt ink containing a thermoplastic vehicle, a colored pigment, and a dispersing agent to inhibit settling or agglomeration of pigment when the ink is molten comprising an isocyanate-modified microcrystalline wax or lignite wax in an amount of 2 to 100 weight percent of the weight of the vehicle. Preferred is the isocyanate-modified microcrystalline wax marketed as Petrolite WB17.

WO9713816A1 (Evans et al.), the disclosure of which is totally incorporated herein by reference, discloses a coloured solid material suitable for use in a hot melt ink comprises an oligomeric hot melt ink jet vehicle formed of molecules having a backbone and at least one pendant side-chain. A dyestuff is reacted onto the backbone. The material is preferably obtainable as the reaction product of an aliphatic or aromatic mono- or di-isocyanate and a hydroxyl group functional dye component, and optionally one or more other suitable materials. Such suitable materials include mono- and dihydric alcohols, primary and secondary monoamines, functional amides, hydroxyl functional amines and hydroxyl containing components having a terminal unsaturated bond.

WO9712003A1 (Evans et al.), the disclosure of which is totally incorporated herein by reference, discloses a hot melt ink jet vehicle is obtained by reacting a mono- or diisocyanate with one or more functional amide materials. The functional amides are the reaction products of one or more hydroxy functional primary or secondary amines and/or diprimary diamines together with a monofunctional carboxylic acid and/or hydroxy carboxylic acid and/or a difunctional carboxylic acid.

The use of phase-change inks in acoustic ink printing processes is also known. U.S. Pat. No. 4,745,419 (Quate et al.), the disclosure of which is totally incorporated herein by reference, discloses acoustic ink printers of the type having a printhead including one or more acoustic droplet ejectors for supplying focused acoustic beams. The printer comprises a carrier for transporting a generally uniformly thick film of hot melt ink across its printhead, together with a heating means for liquefying the ink as it nears the printhead. The droplet ejector or ejectors are acoustically coupled to the ink via the carrier, and their output focal plane is essentially coplanar with the free surface of the liquefied ink, thereby enabling them to eject individual droplets of ink therefrom on command. The ink, on the other hand, is moved across the printhead at a sufficiently high rate to maintain the free surface which it presents to the printhead at a substantially constant level. A variety of carriers may be employed, including thin plastic and metallic belts and webs, and the free surface of the ink may be completely exposed or it may be partially covered by a mesh or perforated layer. A separate heating element may be provided for liquefying the ink, or the lower surface of the carrier may be coated with a thin layer of electrically resistive material for liquefying the ink by localized resistive heating.

U.S. Pat. No. 5,541,627 (Quate), the disclosure of which is totally incorporated herein by reference, discloses a method and apparatus for ejecting droplets from the crests of capillary waves riding on the free surface of a liquid by parametrically pumping the capillary waves with electric fields from probes located near the crests. Crest stabilizers are beneficially used to fix the spatial locations of the capillary wave crests near the probes. The probes are beneficially switchably connected to an AC voltage supply having an output that is synchronized with the crest motion. When the AC voltage is applied to the probes, the resulting electric field adds sufficient energy to the system so that the surface tension of the liquid is overcome and a droplet is ejected. The AC voltage is synchronized such that the droplet is ejected about when the electric field is near is minimum value. A plurality of droplet ejectors are arranged and the AC voltage is switchably applied so that ejected droplets form a predetermined image on a recording surface. The capillary waves can be generated on the free surface of the liquid by using acoustical energy at a level approaching the onset of droplet ejection. The liquid used with the invention must also must be attracted by an electric field.

Phase-change inks used in acoustic ink printing processes also preferably exhibit a low acoustic-loss value, typically below about 100 decibels per millimeter. In addition, the ink vehicle preferably can fill the pores of a porous substrate, such as paper, and preferably has a melting point of from about 80 to about 120° C.; this melting point, along with low acoustic-loss, enables a minimization of energy consumption. When the phase-change inks are used in an electric field assisted acoustic ink printing process, the inks also are sufficiently conductive to permit the transmission of electrical signals generated by the electric field assisted acoustic ink jet printer; the inks preferably exhibit a conductivity of from about 2 to about 9 log(picomho/cm) (which can also be written as from about $1\times10^2$ to about $1\times10^9$ picomhos per centimeter) (measured under melt conditions at about 150° C. by placing an aluminum electrode in the molten ink and reading the resistivity output on a GenRad 1689 precision RLC Digibridge at a frequency of 1 kiloHertz). In general, the conductivity of a material can be measured in terms of the reciprocal of resistivity, which is the capacity for electrical resistance. Further information regarding electric field assisted acoustic ink printing processes is disclosed in, for example, Copending Application U.S. Ser. No. 09/280,717, filed Mar. 30, 1999, entitled "Method and Apparatus for Moving Ink Drops using an Electric Field and Transfuse Printing System Using the Same," with the named inventors John S. Berkes, Vittorio R. Castelli, Scott A. Elrod, Gregory J. Kovacs, Meng H. Lean, Donald L. Smith, Richard G. Stearns, and Joy Roy, the disclosure of which is totally incorporated herein by reference, which discloses a method of forming and moving ink drops across a gap between a printhead and a print medium or intermediate print medium in a marking device. The method includes generating an electric field, forming the ink drops adjacent to the printhead, and controlling the electric field. The electric field is generated to extend across the gap. The ink drops are formed in an area adjacent to the printhead. The electric field is controlled such that an electrical attraction force exerted on the formed ink drops by the electric field is the greatest force acting on the ink drops. The marking device can be incorporated into a transfuse printing system having an intermediate print medium made of one or more materials that allow for lateral dissipation of electrical charge from the incident ink drops.

While known compositions and processes are suitable for their intended purposes, a need remains for improved inks suitable for hot melt acoustic ink printing processes. In addition, a need remains for inks with desirably low viscosity values at hot melt acoustic ink printing printhead temperatures. Further, a need remains for inks that exhibit desirably low acoustic loss values. Additionally, a need remains for inks that generate prints having desirable offset characteristics. There is also a need for inks that generate prints having desirable scratch and smear resistance. In addition, there is a need for inks that generate images which exhibit high projection efficiency and low haze when printed onto transparency stock. Further, there is a need for inks that exhibit good color brightness, especially when printed onto transparency stock. Additionally, there is a need for inks that have desirable conductivity characteristics, particularly when employed in field-assisted acoustic hot melt ink jet printing processes. A need also remains for inks that exhibit good thermal stability. In addition, a need remains for inks that do not undergo undesirable changes with repeated heat/cool cyclings through the ink melting point.

SUMMARY OF THE INVENTION

The present invention is directed to a printing process which comprises (1) incorporating into an acoustic ink jet printing apparatus an ink composition comprising (a) an ink vehicle which comprises a bis(carbamate) of the formula

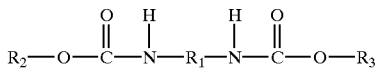

wherein $R_1$ is an alkylene group and $R_2$ and $R_3$ each, independently of the other, are alkyl groups or alkylene oxide or polyalkylene oxide groups of the formula $-(C_nH_{2n}O)_yH$, wherein n is an integer of 2 or 3 and y is an integer representing the number of repeat alkylene oxide units, (b) a colorant, (c) an optional conductivity enhancing agent, (d) an optional antioxidant, (e) an optional UV absorber, (f) an optional clarifier, (g) an optional tackifier, (h) an optional adhesive, and (i) an optional plasticizer, (2) melting the ink, and (3) causing droplets of the melted ink to be ejected by acoustic beams in an imagewise pattern onto a recording sheet.

DETAILED DESCRIPTION OF THE INVENTION

The ink vehicle of the inks of the present invention is a bis(carbamate) of the general formula

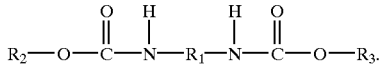

$R_1$ is an alkylene group, preferably linear, although branched and cyclic alkylene groups (such as cyclohexyl, for example), are also suitable; linear groups are most preferred because they frequently result in lowered viscosity. The $R_1$ alkylene group typically has from about 2 to about 12 carbon atoms, preferably from about 4 to about 8 carbon atoms, and most preferably about 6 carbon atoms, although the number of carbon atoms can be outside of these ranges. Accordingly, preferred materials are of the formula

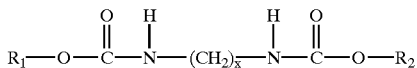

wherein x is an integer representing the number of repeat $-CH_2-$ groups, preferably being from about 2 to about 12, more preferably from about 4 to about 8, and most preferably about 6, although the value of x can be outside of these ranges. $R_1$ and $R_2$ each, independently of the other, are alkyl groups, including linear, branched, and cyclic alkyl groups, aryl groups, or arylalkyl or alkylaryl groups, typically with at least about 2 carbon atoms, preferably with at least about 4 carbon atoms, and more preferably with at least about 6 carbon atoms, and typically with no more than about 30 carbon atoms, preferably with no more than about 22 carbon atoms, and more preferably with no more than about 18 carbon atoms, although the number of carbon atoms can be outside of these ranges, and again with linear alkyl groups being preferred to enable low viscosities, or alkylene oxide or polyalkylene oxide groups of the formula $-(C_nH_{2n}O)_yH$, wherein n is an integer of 2 or 3 and y is an integer representing the number of repeat alkylene oxide units, typically being at least about 1 and typically being no more than about 10, although the value of y can be outside of these ranges. The ink vehicle is a solid at ambient temperature (typically from about 20 to about 25° C., although ambient temperature can be outside of these ranges). Preferably, the ink vehicle has a melting point of at least about 50° C., and more preferably of at least about 60° C., and preferably has a melting point of no more than about 155° C., and typically has an acoustic-loss value of no more than about 100 decibels per millimeter, although the melting point and acoustic-loss value can be outside of these ranges.

Materials of this formula can be prepared by any known or suitable process. For example, they can be prepared by the reaction of a bis(isocyanate) with two equivalents of an alcohol in a toluene solvent in the presence of any desired or suitable catalyst, such as the tertiary amine 1,4-diaza bicyclo [2.2.2] octane, as follows:

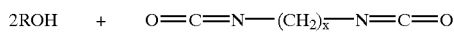

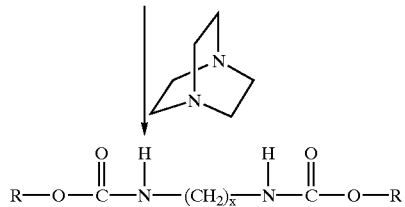

For example, 1,6-bis(octylcarbamoyl)hexane can be prepared by fitting a 100 milliliter round bottom flask with a reflux condenser and nitrogen purge and introducing into the flask 8.41 grams (0.05 mole) of 1,6-diisocyanatohexane, 50 milliliters of toluene, and 10 milligrams of 1,4-diazabicyclo [2.2.2]octane. Thereafter, 13.02 grams (0.1 mole) of 1-octanol is added rapidly and the resulting mixture is heated to reflux. Precipitation is evident at completion of the alcohol addition. The reaction mixture is heated at reflux for 5 hours, cooled, and filtered to secure 1,6-bis (octylcarbamoyl)hexane in about 85 percent yield. Materials wherein the two end "R" groups are different can be prepared by using a mixture of two different alcohols. For example, if one begins with an equimolar mixture of $R_1OH$ and $R_2OH$, the products can be expected to be a statistical mixture of one part

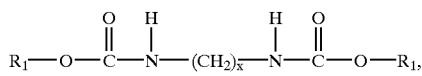

two parts

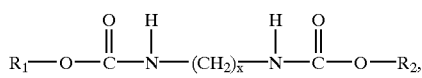

and one part

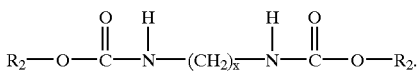

The bis(carbamate) ink vehicle is present in the ink in any desired or effective amount, typically at least about 10 percent by weight of the ink, preferably at least about 20 percent by weight of the ink, and more preferably at least about 40 percent by weight of the ink, and typically no more than about 90 percent by weight of the ink, preferably no more than about 80 percent by weight of the ink, and more preferably no more than about 60 percent by weight of the ink, although the amount can be outside of these ranges.

Any desired or effective colorant can be employed in the inks of the present invention, including dyes, pigments, mixtures thereof, and the like, provided that the colorant can be dissolved or dispersed in the ink vehicle, with spirit soluble dyes being preferred. The colorant is present in the ink in any desired or effective amount to obtain the desired color and hue, typically no less than about 0.5 percent by weight of the ink, and preferably no less than about 1 percent by weight of the ink, and typically no more than about 15 percent by weight of the ink, preferably no more than about 10 percent by weight of the ink, and more preferably no more than about 5 percent by weight of the ink, although the amount can be outside of these ranges.

Examples of suitable pigments include Violet Toner VT-8015 (Paul Uhlich); Paliogen Violet 5100 (BASF); Paliogen Violet 5890 (BASF); Permanent Violet VT 2645 (Paul Uhlich); Heliogen Green L8730 (BASF); Argyle Green XP-111-S (Paul Uhlich); Brilliant Green Toner GR 0991 (Paul Uhlich); Lithol Scarlet D3700 (BASF); Toluidine Red (Aldrich); Scarlet for Thermoplast NSD PS PA (Ugine Kuhlmann of Canada); E. D. Toluidine Red (Aldrich); Lithol Rubine Toner (Paul Uhlich); Lithol Scarlet 4440 (BASF); Bon Red C (Dominion Color Company); Royal Brilliant Red RD-8192 (Paul Uhlich); Oracet Pink RF (Ciba-Geigy); Paliogen Red 3871K (BASF); Paliogen Red 3340 (BASF); Lithol Fast Scarlet L4300 (BASF); Heliogen Blue L6900, L7020 (BASF); Heliogen Blue K6902, K6910 (BASF); Heliogen Blue D6840, D7080 (BASF); Sudan Blue OS (BASF); Neopen Blue FF4012 (BASF); PV Fast Blue B2G01 (American Hoechst); Irgalite Blue BCA (Ciba-Geigy); Paliogen Blue 6470 (BASF); Sudan III (Red Orange) (Matheson, Colemen Bell); Sudan II (Orange) (Matheson, Colemen Bell); Sudan Orange G (Aldrich), Sudan Orange 220 (BASF); Paliogen Orange 3040 (BASF); Ortho Orange OR 2673 (Paul Uhlich); Paliogen Yellow 152, 1560 (BASF); Lithol Fast Yellow 0991K (BASF); Paliotol Yellow 1840 (BASF); Novoperm Yellow FGL (Hoechst); Permanent Yellow YE 0305 (Paul Uhlich); Lumogen Yellow D0790 (BASF); Suco-Yellow L1250 (BASF); Suco-Yellow D1355 (BASF); Suco Fast Yellow D1355, D1351 (BASF); Hostaperm Pink E (American Hoechst); Fanal Pink D4830 (BASF); Cinquasia Magenta (Du Pont); Paliogen Black L0084 (BASF); Pigment Black K801 (BASF); and carbon blacks such as REGAL 330® (Cabot), Carbon Black 5250, Carbon Black 5750 (Columbia Chemical), and the like.

Particularly preferred dyes are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba-Geigy); Direct Brilliant Pink B (Crompton & Knowles); Aizen Spilon Red C-BH (Hodogaya Chemical); Kayanol Red 3BL (Nippon Kayaku); Levanol Brilliant Red 3BW (Mobay Chemical); Levaderm Lemon Yellow (Mobay Chemical); Spirit Fast Yellow 3G; Aizen Spilon Yellow C-GNH (Hodogaya Chemical); Sirius Supra Yellow GD 167; Cartasol Brilliant Yellow 4GF (Sandoz); Pergasol Yellow CGP (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc. A (Morton-Thiokol); Diaazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 26050] (BASF) are preferred.

The inks of the present invention further optionally contain a conductivity enhancing agent when conductive inks are desirable, as in applications such as electric field assisted hot melt acoustic ink printing processes, particularly when the desired conductivity values are not obtained as a result of the other ink components, such as the colorant. Any desired or effective conductivity enhancing agent can be employed. Specific examples of suitable conductivity enhancing agents include complexes of dianilines, including dianiline and bis dianiline compounds, such as (1) 2,2'-dithio dianiline (Aldrich 16,676-6), (2) 4,4'-dithiodianiline (Aldrich 36,946-26), (3) 3,3'-methylene dianiline (Aldrich 37,826-7), (4) 4,4'-methylene dianiline (Aldrich 13,245-4), (5) N-methyl-4,4'-methylene dianiline (Aldrich 42,282-7), (6) 4,4'-methylene bis(2,6-diethyl aniline) (Aldrich 36,078-3), (7) 4,4'-methylene bis(2,6-diisopropyl-N,N-dimethylaniline) (Aldrich 40,353-9), (8) 4,4'-methylene bis(N,N-dimethylaniline) (Aldrich M4,445-1), (9) 4,4'-methylene bis(2,6-dimethylaniline) (Aldrich 36,079-1), (10) 4,4'-methylene bis(3-chloro-2,6-diethylaniline) (Aldrich 42,660-1), (11) 3,3'-(sulfonyl bis(4,1-phenylene))dianiline (Aldrich 44,095-7), (12) 4,4'-(1,3-phenylene diisopropylidene) bisaniline (Aldrich 45,048-0), and the like, as well as mixtures thereof, said dianilines being complexed with, for example, conductivity inducing phosphorous compounds such as phosphorus-containing acid compounds, with specific examples including (1) phenylphosphinic acid (Aldrich P2,880-8), (2) dimethylphosphinic acid (Aldrich 32,829-4), (3) methyl phosphonic acid (Aldrich 28,986-8), and the like, as well as mixtures thereof. Additional suitable conductivity enhancing agents include (1) diethyl-(4-aminobenzyl) phosphonate (Aldrich 33,847-8), (2) diethyl-(phthalimidomethyl) phosphonate (Aldrich 36,622-6), (3) diethyl-(2,2,2-trifluoro-1-hydroxyethyl) phosphonate (Aldrich 43,982-7), (4) diphenyl succinimidyl phosphate (Aldrich 45,061-8), (5) dihexadecyl phosphate (Aldrich 27,149-7), (6) undecylenic acid zinc salt (hardness value 68; Aldrich 32,958-4), (7) zinc bis(2,2,6,6-tetramethyl-3,5-heptanedionate) (Aldrich 41,773-4), (8) zinc cyclohexanebutyrate (Aldrich 22,841-9), (9) zinc stearate (Aldrich 30,756-4), (10) methyl-l-adamantane sulfonate (Aldrich 40,956-1), (11) octadecyl-4-chlorobenzene sulfonate (Aldrich 47,799-0), (12) tetrabutylammonium trifluoromethanesulfonate (Aldrich 34,509-1), (13) S,S'-ethylene-p-toluene thiosulfonate (Aldrich 23,257-2), (14) pyridinium-3-nitrobenzene sulfonate (Aldrich#27,198-5), (14) p-toluene sulfonyl chloride (Aldrich 24,087-7), (15) o-toluene sulfonyl chloride (Aldrich 15,971-9), (16) 1-(p-toluene sulfonyl) imidazole (Aldrich 24,424-4), (17) 1-(p-toluene sulfonyl)-3-nitro-1,2,4-triazole (Aldrich 24,417-1), (18) 2,4,6-triisopropyl benzene sulfonyl chloride (Aldrich 11,949-O), (19) 1-(2,4,6-trisopropyl benzene sulfonyl) imidazole (Aldrich 40,948-O), (20) 1-(2,4,6-triisopropyl benzene sulfonyl)-3-nitro-1,2,4-triazole (Aldrich 40,948-O), (21) 4-nitrobenzene sulfonyl chloride (Aldrich 27,224-8), and the like, as well as mixtures thereof. The conductivity enhancing agent, when present, is present in the ink in any desired or effective amount, typically at least about 0.25 percent by weight of the ink, preferably at least about 0.5 percent by weight of the ink, more preferably at least about 2 percent by weight of the ink, even more preferably at least about 8 percent by weight of the ink, and still more preferably at least about 13 percent by weight, and typically no more than about 50 percent by weight of the ink, preferably no more than about 45 percent by weight of the ink, more preferably no more than about 35 percent by weight of the ink, even more preferably no more than about 25 percent by weight of the ink, and still more preferably no more than about 20 percent by weight of the ink, although the amount can be outside of these ranges.

The inks of the present invention further optionally contain an antioxidant. The optional antioxidants of the ink compositions protect the images from oxidation and also protect the ink components from oxidation during the heating portion of the ink preparation process. Specific examples of suitable antioxidants include (but are not limited to) (1) 2,6-di-tert-butyl-4-methoxyphenol (Aldrich 25,106-2), (2) 2,4-di-tert-butyl-6-(4-methoxybenzyl) phenol (Aldrich 23,008-1), (3) 4-bromo-2,6-dimethylphenol (Aldrich 34,951-8), (4) 4-bromo-3,5-didimethylphenol (Aldrich B6,420-2), (5) 4-bromo-2-nitrophenol (Aldrich 30,987-7), (6) 4-(diethyl aminomethyl)-2,5-dimethylphenol (Aldrich 14,668-4), (7) 3-dimethylaminophenol (Aldrich D14,400-2), (8) 2-amino-4-tert-amylphenol (Aldrich 41,258-9), (9) 2,6-bis(hydroxymethyl)-p-cresol (Aldrich 22,752-8), (10) 2,2'-methylenediphenol (Aldrich B4,680-8), (11) 5-diethylamino)-2-nitrosophenol (Aldrich 26,951-4), (12) antimony dialkyl phosphorodithioate (commercially available from Vanderbilt), (13) molybdenum oxysulfide dithiocarbamate (commercially available from Vanderbilt), (14) (nickel-bis(o-ethyl(3,5-di-tert-butyl-4-hydroxybenzyl) phosphonate (commercially available from Ciba Geigy), (15) 4,4'-methylene-bis(dibutyldithiocarbamate) (commercially available as Vanlube 7723 from Vanderbilt), (16) tetrasodium-N-(1,2-dicarboxyethyl)-N-octadecyl sulfosuccinamate (commercially available from American Cyanamid), (17) 2,6-di-tert-butyl-α-dimethylamino-4-cresol (commercially available as Ethanox-703 from Ethyl Corporation), (18) 2,2'-isobutylidene-bis(4,6-dimethyl phenol) (commercially available as Vulkanox NKF from Mobay Chemicals), (19) 2,2'-methylenebis(6-tert-butyl-4-methylphenol) (commercially available as Cyanox-2246, Aldrich 41,315-5), (20) 2,2'-methylenebis(6-tert-butyl-4-ethylphenol) (commercially available as Cyanox-425, Aldrich 41,314-3), (21) N-isopropyl-N'-phenyl-phenylene diamine (commercially available as Santoflex-13 from Monsanto Chemicals, (22) N-(1,3-dimethylbutyl)-N'-phenyl-phenylene-diamine (commercially available as Santoflex-13 from Monsanto Chemicals), (23) N,N'-di(2-octyl)-4-phenylene diamine (commercially available as Antozite-1 from Vanderbilt), (24) N,N'-bis(1,4-dimethylpentyl)-4-phenylene diamine (commercially available as Santoflex-77 from Monsanto Chemicals), (25) 2,4,6-tris-(N-1,4-dimethyl pentyl-4-phenylenediamino)-1,3,5-triazine (commercially available as Durazone-37 from Uniroyal), (26) D-raffinose pentahydrate (Aldrich 20,667-9), (27) 2,2'-methylene bis(6-tert-butyl-4-methyl-phenol) (Aldrich 41,313-5), (28) 2,6-di-tert-butyl-4-(dimethylaminomethyl) phenol (Aldrich 41,327-5), (29) 4-dodecylresorcinol (Aldrich D22,260-7), (30) Irganox 1010, and the like, as well as mixtures thereof. When present, the optional antioxidants are present in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

The inks of the present invention further optionally contain a UV absorber. The optional UV absorbers in the inks of the present invention primarily protect the images generated therewith from UV degradation. Specific examples of suitable UV absorbers include (but are not limited to) (1) 2-amino-2',5-dichlorobenzophenone (Aldrich 10,515-5), (2) 2'amino-4',5'-dimethoxyacetophenone (Aldrich 32,922-3), (3) 2-benzyl-2-(dimethylamino)-4'-morpholino butyrophenone (Aldrich 40,564-7), (4) 4'-benzyloxy-2'-hydroxy-3'-methylacetophenone (Aldrich 29,884-0), (5) 4,4'-bis (diethylamino) benzophenone (Aldrich 16,032-6), (6) 5-chloro-2-hydroxy benzophenone (Aldrich C4,470-2), (7) 4'-piperazinoacetophenone (Aldrich 13,646-8), (8) 4'-piperidinoacetophenone (Aldrich 11,972-5), (9) 2-amino-5-chlorobenzophenone (Aldrich A4,556-4), (10) 2-bromo-2',4-dimethoxyacetophenone (Aldrich 19,948-6), (11) 2-bromo-2',5'-dimethoxyacetophenone (Aldrich 10,458-2), (12) 2-bromo-3'-nitroacetophenone (Aldrich 34,421-4), (13) 2-bromo-4'-nitroacetophenone (Aldrich 24,561-5), (14) 3',5'-diacetoxyacetophenone (Aldrich 11,738-2, (15) 2-phenylsulfonyl) acetophenone (Aldrich 34,150-3), (16) 3'-aminoacetophenone (Aldrich 13,935-1), (17) 4'-aminoacetophenone (Aldrich A3,800-2), (18) 1H-benzotriazole-1-acetonitrile (Aldrich 46,752-9), (19) 2-(2H-benzotriazol-2-yl)-4,6-di-tert-pentylphenol (Aldrich 42,274-6), (20) 1,1-(1,2-ethane-diyl)bis(3,3,5,5-tetramethylpiperazinone) (commercially available from Goodrich Chemicals), (21) 2,2,4-trimethyl-1,2-hydroquinoline (commercially available from Mobay Chemical), (22) 2-(4-benzoyl-3-hydroxy phenoxy) ethylacrylate, (23) 2-dodecyl-N-(1,2,2,6,6-pentamethyl-4-piperidinyl) succinimide (commercially available from Aldrich Chemical Co., Milwaukee, Wis.), (24) 2,2,6,6-tetramethyl-4-piperidinyl/β,β,β',β'-tetramethyl-3,9-(2,4,8,10-tetraoxo spiro(5,5)-undecane) diethyl]-1,2,3,4-butane tetracarboxylate (commercially available from Fairmount), (25) N-p-ethoxycarbonylphenyl)-N'-ethyl-N'-phenylformadine (commercially available from Givaudan), (26) 6-ethoxy- 1,2-dihydro-2,2,4-trimethylquinoline (commercially available from Monsanto Chemicals), (27) 2,4,6-tris-(N-1,4-dimethylpentyl-4-phenylenediamino)-1,3, 5-triazine (commercially available from Uniroyal), (28) 2-dodecyl-N-(2,2,6,6-tetramethyl-4-piperidinyl) succinimide (commercially available from Aldrich Chemical Co.), (29) N-(1-acetyl-2,2,6,6-tetramethyl-4-piperidinyl)-2-dodecyl succinimide (commercially available from Aldrich Chemical Co.), (30) [1,2,2,6,6-pentamethyl-4-piperidinyl/β, ββ',β'-tetramethyl-3,9-(2,4,8,10-tetraoxo-spiro-(5,5) undecane) diethyl]-1,2,3,4-butane tetracarboxylate (commercially available from Fairmount), (31) [2,2,6,6-tetramethyl-4-piperidinyl)-1,2,3,4-butane tetracarboxylate (commercially available from Fairmount), (32) nickel dibutyl dithio carbamate (commercially available as UV-Chek AM-105 from Ferro), and the like, as well as mixtures thereof. The optional UV absorber, when present, is present in the ink in any desired or effective amount, typically at least about 0.001 percent by weight of the ink, and preferably at least about 0.01 percent by weight of the ink, and typically no more than about 1 percent by weight of the ink, preferably no more than about 0.5 percent by weight of the ink, and more preferably no more than about 0.25 percent by weight of the ink, although the amount can be outside of these ranges.

Other optional additives to the inks include clarifiers, such as UNION CAMP® X37-523-235 (commercially available from Union Camp), in an amount typically of at least about 5 percent by weight of the ink, and preferably at least about 10 percent by weight of the ink, and typically no more than about 40 percent by weight of the ink, and preferably no more than about 25 percent by weight of the ink, although the amount can be outside of this range, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd., synthetic polyterpene resins such as NEVTAC® 2300 and NEVTAC® 80 (commercially available from Neville Chemical Company), WINGTACK® 86, a modified synthetic polyterpene resin (commercially available from Goodyear), and the like, in an amount typically of at least about 1 percent by weight of the ink, and preferably at least about 3 percent by weight of the ink, and typically no more than about 40 percent by weight of the ink, preferably no more than about 20 percent by weight of the ink, and more preferably no more than about 10 percent by weight of the ink, although the amount can be outside of this range, adhesives, such as VERSAMID® 757, 759, or 744 (commercially available from Henkel), in an amount typically of at least about 0.5 percent by weight of the ink, preferably at least about 5 percent by weight of the ink, and more preferably at least about 10 percent by weight of the ink, and typically no more than about 50 percent by weight of the ink, preferably no more than about 40 percent by weight of the ink, and more preferably no more than about 20 percent by weight of the ink, although the amount can be outside of this range, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), KP-140®, a triphenyl phosphate (commercially available from MC Corporation), MORFLEX® 150, a dicyclohexyl phthalate (commercially available from Morflex Chemical Company Inc.), trioctyl trimellitate (commercially available from Eastman Kodak Co.), and the like, in an amount typically of at least about 0.5 and typically no more than about 20 percent by weight of the ink, and preferably no more than about 10 percent by weight of the ink, although the amount can be outside of this range, and the like.

The ink compositions of the present invention typically have melting points no lower than about 50° C., preferably no lower than about 70° C., and more preferably no lower than about 80° C., and typically have melting points no higher than about 160° C., preferably no higher than about 140° C., and more preferably no higher than about 120° C., although the melting point can be outside of these ranges.

The ink compositions of the present invention generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 30 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

Hardness is a property of solids and plastics that is defined by their solidity and firmness as measured by their resistance to indentation by an indenter of fixed shape and size under a static load. The hardness of images can be measured with a Digital-Pencil style Durometer, Model 211 B-00 PTC, obtained from Pacific Transducer Corporation, using ASTM Standard specifications for resistance to penetration with a conical [30 degrees included angle] indenter and applying a 1 kilogram load. The hardness range for materials as measured with this instrument is from about 1 to about 100, the latter being the highest measurable value. It is believed that the images generated with the inks of the present invention, after cooling to ambient temperature (typically from about 20 to about 25° C., although ambient temperature can be outside of this range) will exhibit hardness values of at least about 70 or more.

The inks of the present invention typically exhibit acoustic-loss values of no more than about 100 decibels per millimeter, preferably no more than about 60 decibels per millimeter, and more preferably no more than about 40 decibels per millimeter, although the acoustic-loss value can be outside of these ranges. There is no necessary lower limit on acoustic-loss value for the inks; it is believed that practically achievable lower limits are around 10 decibels per millimeter, although, if practically achievable, lower acoustic-loss alues are acceptable. Acoustic-loss can be measured by placing a sample of the material to be measured between two transducers with the temperature set at about 150° C. The samples are allowed to equilibrate at 150° C. for five minutes. The two transducers are then brought together to maximize the acoustic signal. The amplitude and the position of the signals are recorded. The two transducers are then separated by a distance varying from about 25.4 microns to about 125.4 microns, recording each time the amplitude and the position of the signal. Preferably, each measurement is performed three times, and three samples of the same material are measured. The attenuation decibels per millimeter is then calculated by rationing the amplitude values obtained at different separation distances.

The inks of the present invention typically exhibit a conductivity of no less than about 2 log(picomho/cm), preferably no less than about 6 log(picomho/cm), more preferably no less than about 6.5 log(picomho/cm), and even more preferably no less than about 7 log(picomho/cm), although the conductivity can be outside of these ranges. While there is no upper limit on conductivity, typical conductivity values generally do not exceed about 9 log (picomho/cm). Conductivity can be measured under melt conditions (typically at about 150° C.) by placing an aluminum electrode in the molten ink and reading the resistivity output on a GenRad 1689 precision RLC Digibridge at a frequency of 1 kiloHertz). The conductivity of the material is measured in terms of the reciprocal of resistivity, which is the capacity for electrical resistance.

The inks of the present invention exhibit substantial transparency. The images generated with the inks typically exhibit haze alues of no more than about 25, preferably no more than about 20, and more preferably no more than about 15, although the haze value can be outside of these ranges. There is no required lower limit on haze values. Haze values can be measured on images printed with the ink on uncoated polyester, such as MYLAR®, with a Haze meter XL-211, HAZEGARD® System obtained from Pacific Scientific Company.

The ink compositions of the present invention can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks of the present invention are solid at ambient temperature.

The present invention is directed to a process which entails incorporating an ink of the present invention into an ink jet printing apparatus, melting the ink, and causing droplets of the melted ink to be ejected in an imagewise pattern onto a recording sheet, wherein the printing apparatus employs an acoustic ink jet process, wherein droplets of the ink are caused to be ejected in imagewise pattern by acoustic beams. In one preferred embodiment, the printing apparatus employs an acoustic ink jet printing process wherein droplets of the ink are formed by acoustic beams without imparting a substantial velocity component toward the print medium, using a droplet forming force that is sufficient only to form the ink droplets, and the printing process further comprises generating an electric field to exert an electrical force different from the droplet forming force on the ink droplets to move the ink droplets toward the print medium, and controlling the electrical force exerted on the formed complete ink droplets by the electric field. In another preferred embodiment, the print medium is an intermediate print medium. In a particularly preferred form of this embodiment, the printing apparatus employs a printhead that forms ink drops, a platen, and an intermediate print medium positioned between the printhead and the platen, wherein an electric field is generated between the printhead and the platen and the ink drops are charged and accelerated by the electric field in the direction of the platen, and wherein the intermediate print medium has an electrical conductivity that is capable of dissipating a charge of the ink drops laterally through the intermediate print medium. The image is transferred from the intermediate print medium to a recording sheet substrate. In specific embodiments, the intermediate print medium and/or the final image-bearing recording sheet substrate can be heated and/or subjected to pressure before, during, or after transfer from the intermediate print medium to the recording sheet substrate. Embodiments which entail the use of field assistance or intermediate transfuse methods are disclosed in, for example, Copending Application U.S. Ser. No. 09/280,717, filed Mar. 30, 1999, entitled "Method and Apparatus for Moving Ink Drops using an Electric Field and Transfuse Printing System Using the Same," with the named inventors John S. Berkes, Vittorio R. Castelli, Scott A. Elrod, Gregory J. Kovacs, Meng H. Lean, Donald L. Smith, Richard G. Stearns, and Joy Roy, the disclosure of which is totally incorporated herein by reference. Additional background information on transfuse applications is disclosed in, for example, U.S. Pat. No. 4,538,156, U.S. Pat. No. 5,372,852, U.S. Pat. No. 5,502,476, U.S. Pat. No. 5,245,358, U.S. Pat. No. 5,389,958, U.S. Pat. No. 5,614,933, U.S. Pat. No. 5,099,256, U.S. Pat. No. 5,471,233, U.S. Pat. No. 5,493,373, U.S. Pat. No. 5,353,105, U.S. Pat. No. 4,860,036, and WO9307000, the disclosures of each of which are totally incorporated herein by reference.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink Vehicle Preparation

Bis(carbamate) Compounds of the Formula

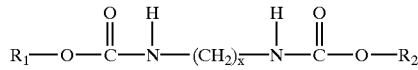

were prepared by the following scheme

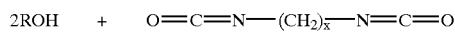

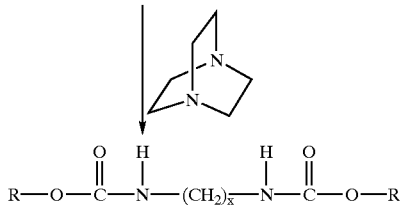

as follows. In a 100 milliliter round bottom flask fitted with a reflux condenser and inert gas purge were added, under an inert atmosphere of argon, the diisocyanate, a toluene solvent, and a catalytic amount of diazobicyclo[2.2.2]octane (DABCO). A small stoichiometric excess of the alcohol was then added rapidly and the mixture was heated to reflux. Precipitation was evident at completion of the alcohol addition. The reaction mixture was heated at reflux for 5 hours, cooled, and filtered. Yields were virtually quantitative in all cases. Specific syntheses were as follows:

A

R=—$C_2H_4OC_2H_5$; x=6

Hexamethylene diisocyanate (8.41 grams, 0.05 mol) was added to ethylene glycol monoethyl ether (9.01 grams, 0.1 mol) in 100 milliliters of toluene containing 10 milligrams of DABCO. The resulting product was a white solid with a melting point of 69° C.

B

R=—$C_4H_9$; x=6

Hexamethylene diisocyanate (8.41 grams, 0.05 mol) was added to n-butanol (7.41 grams, 0.1 mol) in 100 milliliters of toluene containing 10 milligrams of DABCO. The resulting product was a white solid with a melting point of 94° C.

C

R=—$C_6H_{13}$; x=6

Hexamethylene diisocyanate (8.41 grams, 0.05 mol) was added to 1-hexanol (10.22 grams, 0.1 mol) in 100 milliliters of toluene containing 10 milligrams of DABCO. The resulting product was a white solid with a melting point of 96° C.

D

R=—$C_8H_{17}$; x=6

Hexamethylene diisocyanate (8.41 grams, 0.05 mol) was added to 1-octanol (13.02 grams, 0.1 mol) in 100 milliliters of toluene containing 10 milligrams of DABCO. The resulting product was a white solid with a melting point of 106° C.

E

R=—$C_{12}H_{25}$; x=6

Hexamethylene diisocyanate (8.41 grams, 0.05 mol) was added to 1-dodecanol (18.63 grams, 0.1 mol) in 100 milliliters of toluene containing 10 milligrams of DABCO. The resulting product was a white solid with a melting point of 115° C.

F

R=—$C_{16}H_{33}$; x=6

Hexamethylene diisocyanate (8.41 grams, 0.05 mol) was added to 1-hexadecanol (24.25 grams, 0.1 mol) in 100 milliliters of toluene containing 10 milligrams of DABCO. The resulting product was a white solid with a melting point of 118° C.

G

R=—$C_8H_{17}$; x=12

1,12-diisocyanotododecane (12.62 grams, 0.05 mol) was added to 1-octanol (13.02 grams, 0.1 mol) in 100 milliliters of toluene containing 10 milligrams of DABCO. The resulting product was a white solid with a melting point of 102° C.

EXAMPLE II

Ink Preparation

Five ink compositions were prepared containing a bis(carbamate) ink vehicle prepared as described in Example IC (wherein R is —$C_6H_{13}$ and x is 6), a clarifier (UNION CAMP® X37-523-235, obtained from Union Camp), an adhesive (VERSAMID® 759 or 744, obtained from Henkel), and a colorant (DUASYN® BLACK A-RG VP280 (obtained from Clariant). Some of the inks also contained a tackifier (FORAL® 85, obtained from Hercules) and/or a plasticizer (UNIPLEX® 250, obtained from Uniplex). The inks were prepared by heating and admixing the ingredients. The specific amounts of the various ingredients in the ink compositions were as follows:

| Ink | Vehicle | Clarifier | Tackifier | Adhesive | Plasticizer | Dye |
|---|---|---|---|---|---|---|
| 1 | 54 | 15 | 0 | 25* | 0 | 6 |
| 2 | 69 | 10 | 0 | 15** | 0 | 6 |
| 3 | 49.9 | 7.85 | 5.67 | 30.29* | 0 | 6.29 |
| 4 | 44.4 | 7.85 | 5.67 | 35.29* | 0 | 6.79 |
| 5 | 47.98 | 8.35 | 5.67 | 20.86** | 10.35 | 6.79 |

*VERSAMID ® 759
**VERSAMID ® 744

The inks thus prepared were evaluated for melt viscosity (viscosity, in centipoise, measured at 150° C.), maximum hardness (measured with a PTC Instrument Durometer model 211, ASTM D2240 specification), and haze (measured with a BYK Gardner-Haze Gard plus for transparency). The results were as follows:

| Ink | Melt Viscosity | Hardness | Haze |
|---|---|---|---|
| 1 | 12.9 | 76.58 | 16.8 |
| 2 | 12.6 | 71.95 | 19 |
| 3 | 14.3 | 76.09 | 10 |
| 4 | 17.2 | 69.78 | 15.6 |
| 5 | 20.6 | 76.98 | 21.2 |

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. A printing process which comprises (1) incorporating into an acoustic ink jet printing apparatus an ink composition comprising (a) an ink vehicle which comprises a bis(carbamate) of the formula

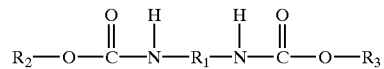

wherein $R_1$ is an alkylene group and $R_2$ and $R_3$ each, independently of the other, are alkyl groups or alkylene oxide or polyalkylene oxide groups of the formula —$(C_nH_{2n}O)_yH$, wherein n is an integer of 2 or 3 and y is an integer representing the number of repeat alkylene oxide units, (b) a colorant, (c) an optional conductivity enhancing agent, (d) an optional antioxidant, (e) an optional UV absorber, (f) an optional clarifier, (g) an optional tackifier, (h) an optional adhesive, and (i) an optional plasticizer, (2) melting the ink, and (3) causing droplets of the melted ink to be ejected by acoustic beams in an imagewise pattern onto a recording sheet.

2. A process according to claim 1 wherein the ink has a melting point of no lower than about 50° C. and no higher than about 160° C.

3. A process according to claim 1 wherein the ink has a melt viscosity at jetting temperature of no higher than about 30 centipoise.

4. A process according to claim 1 wherein the ink has a melt viscosity at jetting temperature of no higher than about 20 centipoise.

5. A process according to claim 1 wherein images generated with the ink exhibit a haze value of no more than about 25.

6. A process according to claim 1 wherein images generated with the ink exhibit a hardness value of at least about 70.

7. A process according to claim 1 wherein the ink vehicle is present in the ink in an amount of no less than about 10 percent by weight of the ink and no more than about 90 percent by weight of the ink.

8. A process according to claim 1 wherein the ink vehicle is present in the ink in an amount of no less than about 40 percent by weight of the ink and no more than about 60 percent by weight of the ink.

9. A process according to claim 1 wherein the bis(carbamate) is of the formula

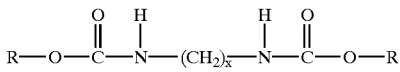

wherein R is selected from —$C_2H_4OC_2H_5$, —$C_4H_9$, —$C_6H_{13}$, —$C_8H_{17}$, —$C_{12}H_{25}$, —$C_{16}H_{33}$, or mixtures thereof, and x is from about 6 to about 12.

10. A process according to claim 9 wherein R is —$C_2H_4OC_2H_5$ and x is 6.

11. A process according to claim 9 wherein R is —$C_4H_9$ and x is 6.

12. A process according to claim 9 wherein R is —$C_6H_{13}$ and x is 6.

13. A process according to claim 9 wherein R is —$C_8H_{17}$ and x is 6.

14. A process according to claim 9 wherein R is —$C_{12}H_{25}$ and x is 6.

15. A process according to claim 9 wherein R is —$C_{16}H_{33}$ and x is 6.

16. A process according to claim 9 wherein R is —$C_8H_{17}$ and x is 12.

17. A process according to claim 1 wherein droplets of the ink are formed by acoustic beams without imparting a substantial velocity component toward the print medium, using a droplet forming force that is sufficient only to form the ink droplets, and wherein the printing process further comprises generating an electric field to exert an electrical force different from the droplet forming force on the ink droplets to move the ink droplets toward the print medium, and controlling the electrical force exerted on the formed complete ink droplets by the electric field.

18. A process according to claim 1 wherein droplets of the melted ink to be ejected by acoustic beams in an imagewise pattern onto an intermediate print medium and the imagewise pattern of ink droplets is subsequently transferred from the intermediate print medium to the recording sheet.

19. A process according to claim 1 wherein the printing apparatus employs a printhead that forms ink drops, a platen, and an intermediate print medium positioned between the printhead and the platen, wherein an electric field is generated between the printhead and the platen and the ink drops are charged and accelerated by the electric field in the direction of the platen, wherein the intermediate print medium has an electrical conductivity that is capable of dissipating a charge of the ink drops laterally through the intermediate print medium, and wherein the imagewise pattern of ink droplets is subsequently transferred from the intermediate print medium to the recording sheet.

20. A process according to claim 1 wherein the imagewise pattern of ink droplets is heated, subjected to pressure, or both heated and subjected to pressure.

* * * * *